United States Patent [19]

Presant

[11] Patent Number: 4,855,899
[45] Date of Patent: Aug. 8, 1989

[54] MULTIPLE I/O BUS VIRTUAL BROADCAST OF PROGRAMMED I/O INSTRUCTIONS

[75] Inventor: Stephen D. Presant, Medway, Mass.

[73] Assignee: Prime Computer, Inc., Natick, Mass.

[21] Appl. No.: 37,707

[22] Filed: Apr. 13, 1987

[51] Int. Cl.[4] .......................... G06F 3/00; G06F 9/00; G06F 13/20
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,938,098 | 2/1976 | Garlic | 364/200 |
| 4,665,482 | 5/1987 | Murry et al. | 364/200 |
| 4,672,537 | 6/1987 | Katzman et al. | 364/200 |
| 4,707,693 | 11/1987 | Hessel | 340/825.51 |

Primary Examiner—Archie E. Williams, Jr.
Assistant Examiner—Ayni Mohamed
Attorney, Agent, or Firm—Wolf, Greenfield & Sacks

[57] ABSTRACT

A method of performing an input/output process containing a programmed input/output (PIO) instruction in a multiprocessor system including at least two processors each having an associated I/O bus with I/O devices connected thereto. The method has the steps of storing a unique address and a bus location for each I/O device in a device location table, determining the address of a referenced I/O device prior to performing the PIO instruction, reading the corresponding I/O bus location of the referenced I/O device from the device location table and executing the input/output process on the prescribed processor associated with the I/O bus to which the referenced I/O device is located. The method is used in conjunction with a task scheduler including a process control block for each scheduled process. When the PIO instruction references a device on the local I/O bus, the input/output process is executed normally. To execute the input/output process on a remote processor, a locked descriptor identifying the remote processor is placed in the process control block for that process. The input/output process is then scheduled for execution on the remote processor.

6 Claims, 3 Drawing Sheets

| I/O DEVICE ADDRESS | I/O BUS LOCATION |
|---|---|
| 0 | 0 |
| 1 | 20 |
| 2 ... 6 | 0 |
| 7 | 20 |
| 8 | 22 |
| 9 | 22 |
| 10 | 0 |
| 11 ... 22 | 0 |
| 23 | 20 |
| 24 | 22 |
| 25 | 22 |
| 26 | 22 |
| 27 ... 30 | 0 |
| 31 | 20 |
| 32 ... 39 | 0 |
| 40 | 20 |
| 41 | 0 |
| 42 | 22 |
| 43 ... 62 | 0 |
| 63 | 20 |

0 => DEVICE DOES NOT EXIST
20 => DEVICE IS ON I/O BUS 20
22 => DEVICE IS ON I/O BUS 22

MULTIPLE I/O BUS VIRTUAL BROADCAST OF PROGRAMMED I/O INSTRUCTIONS

FIELD OF THE INVENTION

This invention relates to a technique for performing programmed input/output instructions in a multiprocessor system and, more particularly, to a technique for performing programmed input/output instructions on multiple I/O buses without requiring extensive hardware or software modifications from an existing uniprocessor design.

BACKGROUND OF THE INVENTION

Computer software is typically designed for use in a uniprocessor environment wherein a single processor communicates with one or more input/output (I/O) devices on a single I/O bus. Programmed input/output (PIO) instructions wherein the software communicates with an I/O device are all performed on the same I/O bus.

Multiprocessor systems having two or more concurrently operating processors are utilized to increase processing capability. A single I/O bus may be connected to one of the processors. All I/O must be performed by the associated processor, thereby placing a heavier workload on the processor to which the I/O bus is connected. The I/O capability of the multiprocessor system is limited by the capabilities of the single I/O bus.

Multiple I/O buses can be connected to the multiple processors to increase I/O speed and capacity using existing uniprocessor and uni-I/O bus communication design techniques. Each processor can only communicate with its associated or "local" I/O bus. However, a serious software compatibility problem arises. The software running on the multiprocessor system may attempt to perform an I/O process containing PIO instructions referencing I/O devices located on any one of the I/O buses in the system. As used herein, an I/O process is any process that attempts to execute a programmed I/O instruction, and a process, or task, is a single program entity in a multiprogrammed system. When the software running on a particular processor references an I/O device connected on the local I/O bus, no problem occurs. However, when the software references an I/O device connected on a remote I/O bus, the software (originally designed for a uniprocessor system) does not know that the device is connected to a remote I/O bus and does not know if there is a communication link to the referenced I/O device.

One solution is to provide a hardware connection between each processor and each I/O bus. However, the system design is unduly complicated because additional hardware is required for the bus interconnections, and control hardware is required to arbitrate processor requests for use of each I/O bus. When each I/O bus is not physically interconnected with each processor, the PIO instruction can only be performed on the processor associated with the I/O bus where the referenced I/O device is connected. However, it is desirable to allow software to reference the I/O devices on more than one I/O bus. Also, it must be guaranteed that PIO is only attempted on the processor associated with the I/O bus containing the referenced device.

It is a general object of the present invention to provide a method for performing programmed input/output instructions in a multiprocessor system having at least two I/O buses, without unduly complicating the hardware.

It is another object of the present invention to provide a method for performing programmed input/output instructions so as to provide software compatibility between a uniprocessor system and a multiprocessor system having at least two I/O buses.

It is a further object of the present invention to provide a method for performing an input/output process containing a programmed input/output instruction in a multiprocessor system having at least two I/O buses by forcing the input/output process to run on the processor associated with the I/O bus to which a referenced I/O device is connected.

SUMMARY OF THE INVENTION

According to the present invention, these and other objects and advantages are achieved in a method for performing an input/output process containing a programmed input/output instruction in a multiprocessor system including at least two processors, each having an associated I/O bus with one or more I/O devices connected thereto. The method comprises the steps of storing a unique I/O device address and an I/O bus location for each I/O device in a device location table, determining the address of a referenced I/O device prior to performing the programmed input/output instruction, reading the corresponding I/O bus location of the referenced I/O device from the device location table, and executing the input/output process on the processor associated with the I/O bus to which the referenced I/O device is connected.

The multiprocessor system includes process scheduling means for scheduling and running processes according to their priorities. The process scheduling means includes a process control block associated with each scheduled process. The step of executing the input/output process includes the steps of executing the input/output process on the local processor when the referenced I/O device is connected to the local I/O bus and, when the referenced I/O device is connected to a prescribed remote I/O bus, placing a locked descriptor in the process control block of the input/output process, the locked descriptor indicating that the input/output process can be performed only on the remote processor associated with the prescribed remote I/O bus, saving the registers of the input/output process in its process control block, and scheduling the input/output process in accordance with its priority on the remote processor associated with the prescribed remote I/O bus.

The method of the present invention results in the software effectively providing a virtual broadcast of programmed input/output operations to all I/O devices connected to the system. The term "virtual broadcast" is appropriate because the software appears to communicate with an I/O device located on any I/O bus when it executes a programmed input/output instruction. In reality, only the processor associated with the referenced I/O bus executes the instruction and only one I/O bus is used. The software is not required to know the I/O bus to which a referenced I/O device is connected, nor is it required to determine whether there is a communication path between the processor and the referenced I/O device. The hardware for interconnection of multiple I/O buses and the control hardware for bus arbitration are eliminated as a result of the present invention. Software designed for use on a uniprocessor system is compatible with multiprocessor systems.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 2 illustrates a device location table for the multiprocessor system of FIG. 1.

DETAILED DESCRIPTION OF THE INVENTION

Figure 1:
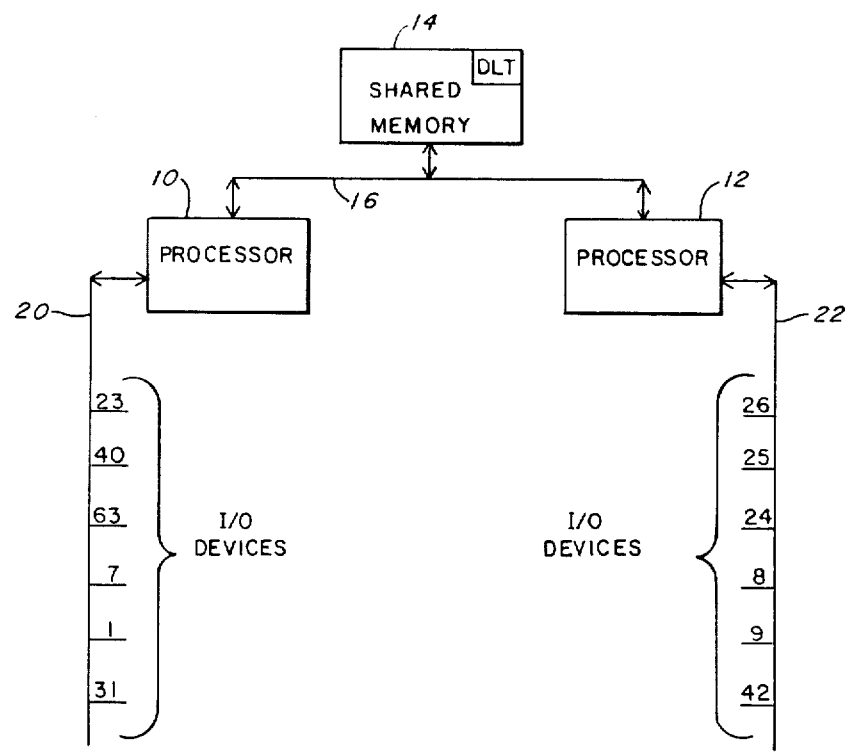
FIG. 1 is a block diagram of a multiprocessor system suitable for incorporation of the present invention.

The present invention provides an algorithm for enabling programmed input/output (PIO) instructions, wherein software communicates with an I/O device, to run on a multiprocessor system having two or more I/O buses. The algorithm forces an I/O process containing the PIO instruction to run on the processor associated with the I/O bus to which the referenced I/O device is connected. Modification of the I/O process software is not required to implement the algorithm.

The present invention requires that the computer system operate in a multiprogrammed, or multitasking, environment having an operating system that allows multiple tasks in memory which share the central processing unit. The system is assumed to be a tightly coupled multiprocessor having a central processing unit composed of multiple processors, each of which can execute any task in shared memory, and having only one operating system. The operating system includes a task scheduler that schedules tasks for execution on the processors according to their assigned priorities. Tasks of appropriate priority are scheduled to run on an available processor until a required resource is unavailable. Then, the task of next highest priority is run until the required resource becomes available. The task scheduler uses process control blocks which contain information regarding every scheduled task or process. The process control block typically contains scheduling information such as priority, scheduling, queues, pointers and register states; registers including a program counter, program status word, general registers and address registers; and account information such as total elapsed time, CPU time used and time remaining in time slice. As described hereinafter, the process control block can also include a locked descriptor. The information in the process control block permits a task to be started or resumed when the necessary resources are available and no higher priority task is waiting.

A suitable multiprocessor configuration includes two or more processors with a shared memory. Each processor has an associated input/output (I/O) bus each of which in turn has one or more I/O devices connected to it. In order to achieve total software compatibility, the multiple I/O buses must appear as a single I/O bus at the software level. Therefore, every I/O device in the system must have a unique I/O device address. This requirement is distinguished from the case where a unique device address is required only on each I/O bus.

The invention is an algorithm for forcing the input/output process to run on the processor associated with the I/O bus where the referenced I/O device is connected. It requires no special hardware and yet has minimal performance overhead. The invention eliminates the need for a communication link between every I/O bus and every processor. When a programmed input/output instruction is executed, the processor determines if the referenced I/O device is connected on the local I/O bus with which it can directly communicate. If the referenced I/O device is on the local bus, then the programmed input/output instruction is performed normally. If the referenced I/O device is connected on a remote I/O bus, then the programmed input/output instruction is forced to be executed on the remote processor associated with the I/O bus on which the referenced I/O device is connected, as described hereinafter. When the input/output process is scheduled for a remote processor, the local processor then executes the task of next highest priority in the schedule.

A multiprocessor system suitable for incorporation of the present invention is shown in block diagram form in FIG. 1. A processor 10 and a processor 12 communicate with a shared memory 14 on a multiconductor memory bus 16. In the present example, the processors 10 and 12 communicate with each other via the shared memory 14. However, the dual processor system may have any desired memory configuration and any desired channel of communication between processors with the limitation that the system have a single operating system including means for scheduling tasks on processors 10 and 12 according to priority.

An I/O bus 20 is connected to processor 10 and an I/O bus 22 is connected to processor 12. The I/O buses 20, 22, each of which is a multiconductor data communication link, provide communication between each processor and the I/O devices connected on the respective I/O bus. The I/O devices, which may include interfaces to disk drives, tape drives, video display terminals and the like, are shown diagrammatically in FIG. 1 by numbers representing I/O device addresses. Thus, I/O devices having addresses 23, 40, 63, 7, 1 and 31 are connected to I/O bus 20; and I/O devices having addresses 26, 25, 24, 8, 9 and 42 are connected to I/O bus 22. As noted above, a requirement of the present invention is that each I/O device in the system must have a unique address. For example, since an I/O device having address 23 is located on I/O bus 20, no other I/O device in the system, including an I/O device connected to I/O bus 22, is permitted to be assigned address 23. Each of the processors 10, 12 can be identical and based on a uniprocessor design. An example of such a processor is Model P9955II manufactured by Prime Computer. Each processor has been modified to support shared memory in the dual processor configuration, but no I/O hardware modifications have been made.

As an initial step in carrying out the present invention, a device location table is formed. The device location table (DLT) may exist in the shared memory 14 and is preferably formed during system initialization. It has fixed entries as long as the I/O device configuration remains the same. The device location table includes an entry corresponding to each possible unique I/O device address. An example of a device location table for the system of FIG. 1 is shown in FIG. 2. For each I/O device address, there are three possible entries; 0 indicating that an I/O device does not exist for that address, 20 indicating that the I/O device is connected to I/O bus 20, and 22 indicating that the I/O device is connected to I/O bus 22. When the system includes more than two I/O buses, more than two I/O device locations are required. The device location table is formed during system initialization by polling each of the I/O buses 20, 22 to determine the addresses of the I/O devices connected to that bus. For each address, an entry is made in the device location table as shown in FIG. 2.

When a programmed input/output instruction is to be executed, the processor determines if the referenced I/O device is connected on the I/O bus with which it can directly communicate. If this is the case, then the PIO instruction is executed normally. If the referenced I/O device resides on a different, or remote, I/O bus, then a process exchange mechanism is used to force the I/O process to be executed on the appropriate remote processor. The term "process exchange" refers to the method employed by a processor when it switches from one task or process to another. This mechanism is also referred to as "context switching."

In order to force the input/output process to be executed on the appropriate remote processor, the multiprocessor process exchange algorithm needs to recognize that a process can be locked to a processor. This is achieved by having the processor check a locked descriptor before executing a new process. If the process is locked to another processor, then this processor must find a different process to run. This function is required for use of the invention, but it is often included in multiprocessor systems for other applications, such as performance measurement.

To force the process containing the PIO instruction to execute on an appropriate remote processor, the I/O process is locked to that remote processor and a pseudo-notify is performed. In other words, the I/O process is treated as if it just became ready for execution. The local processor that initiated execution of the PIO instruction will not attempt to run that process again because it is locked to another remote processor. Instead, the local processor finds the next highest priority task to run. The remote processor that is the target of the I/O process will begin running that process as soon as it is the highest priority task that can be run. When the I/O process does run on the remote processor, it is executed in normal fashion.

In most computer architectures, there are hardware registers that are defined to control or support I/O operations. These registers need to be maintained in a coherent manner to support I/O activity on the multiple I/O buses. I/O virtual-to-physical memory mapping registers and I/O channel control registers are examples of these registers. In most cases, coherency can be maintained using any general purpose interprocessor communication technique. Such techniques which may be in hardware or software are generally part of every multiprocessor system.

The invention has the side effect of leaving processes locked to a particular processor. In most cases, this is a desirable side effect. Since communication to I/O devices is usually performed by device interface modules (DIM's) on behalf of users, only the DIM's become locked. Since DIM's will communicate with the same I/O devices repeatedly, or in some cases can only communicate with one I/O device, the DIM's will usually be executing on the appropriate processor. If there is balanced activity on each I/O bus, then the DIM's should be approximately balanced on the multiple processor. In the few cases where users directly perform I/O instructions, the user in this case is an I/O process, but he can have his locked descriptor field cleared whenever he releases or unassigns an I/O device (that is, he is finished performing PIO instructions). This is only necessary to insure load balancing of users on the system.

The process exchange algorithm of the present invention can be implemented in microcode in the processors of the multiprocessor. No software modifications are required in order to use this algorithm. The algorithm can also be implemented in a combination of microcode and software, depending on the architecture of the multiprocessor system being used.

Figure 3:
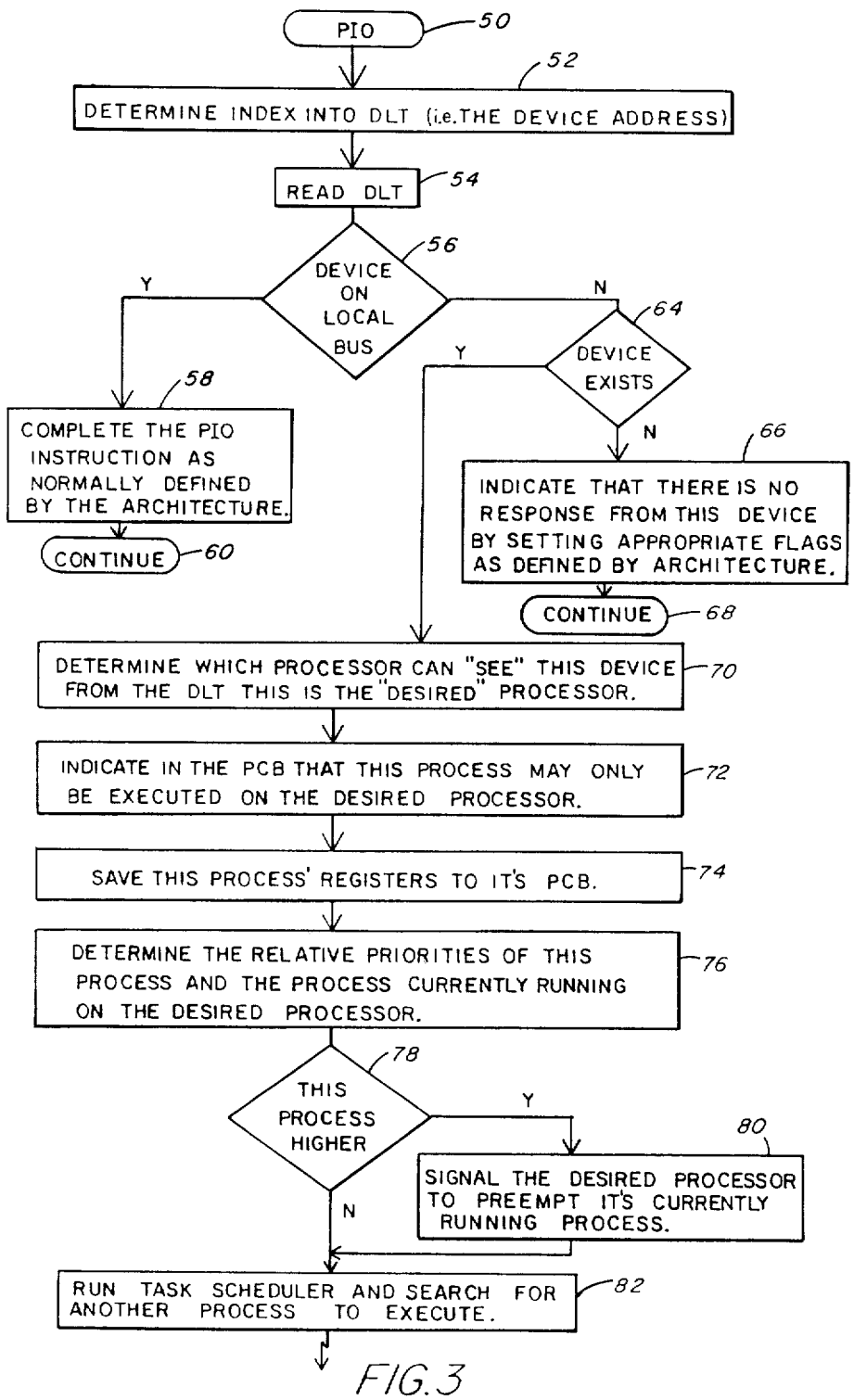
FIG. 3 is a flow diagram illustrating the method of the present invention.

A flow chart of the programmed I/O instruction is illustrated in FIG. 3. The algorithm is initiated when a processor begins execution of a programmed input/output instruction, as indicated in step 50. In step 52 of the microcode algorithm, the instruction is examined to determine the referenced I/O device address. In step 54, the location of the referenced I/O device is read from the device location table (FIG. 2) utilizing the address of the referenced I/O device. In step 56, the algorithm determines whether the referenced I/O device is connected on the local I/O bus. When the referenced I/O device is in fact connected to the local I/O bus, the PIO instruction is executed in step 58 in the normal manner as required by the architecture of the processor. The PIO instruction is completed, and the processor continues executing the process that contained the PIO instruction, as shown in step 60.

When the referenced I/O device is found in step 56 to not be connected on the local I/O bus, the existence of the referenced I/O device in the system is verified in step 64 of the algorithm. When the referenced I/O device for some reason is not part of the system, appropriate flags are set in step 66 as required by the computer architecture, and the processor continues executing the same process as shown in step 68.

When the referenced I/O device is found in step 64 to be connected to the multiprocessor system, the remote processor connected to the referenced I/O device is identified in step 70. The remote processor is identified by reference to the device location table. Next, in step 72, the process control block (PCB) of the task scheduler is notified that this programmed input/output process may only be executed on the remote processor identified in the previous step. This notification is done by placing a locked descriptor in the PCB for this process. Whenever the task scheduler attempts to run this process, it will first reference the locked descriptor to determine whether the process is locked to a particular processor and will run the process only on that processor. The process registers for this I/O process are saved in the PCB in step 74 so that the process can be resumed on the appropriate remote processor.

Now the I/O process is ready for scheduling on the appropriate remote processor. The relative priorities of the I/O process and the process currently running on the appropriate remote processor are determined in step 76. When the I/O process is found in step 78 to be higher in priority than the currently running process, the remote processor is signalled in step 80 to preempt its currently running process and to begin running the I/O process in question. Communication between processors can be by any conventional means such as by a mailbox in shared memory 14. The local processor then searches in step 82 for another process for execution. This is done by exiting to the task scheduler itself.

An example of the operation of the algorithm of the present invention will now be given with reference to FIGS. 1-3. Assume there is a single process called D2XDIM that schedules activity for I/O devices at addresses 23, 24, 25 and 26, and assume that processor 12 is executing D2XDIM. A PIO instruction is executed which requires communication with the I/O device at address 26. Since I/O device 26 is connected to processor 12 on I/O bus 22 as indicated in the device location table, processor 12 performs the specified PIO operation on I/O bus 22.

Later, processor 12 executes another PIO instruction which is still part of the D2XDIM process. This time the PIO operation is intended for the I/O device at address 23. Processor 12 determines from the device location table that the referenced I/O device is connected to processor 10 on I/O bus 20. Processor 12 then modifies the locked descriptor word in the process control block for D2XDIM so that the locked descriptor now indicates that D2XDIM may only be executed by processor 10. Processor 12 determines that processor 10 is currently running a higher priority task, so processor 12 does not send a message to processor 10. Processor 12 finds a new unrelated task to execute after it has saved the registers for D2XDIM in the process control block for D2XDIM.

Later, the task that was running on processor 10 releases processor 10 because a required resource is not available. Processor 10 finds that D2XDIM is the highest priority task that can be run. The state of D2XDIM is loaded into processor 10 from the process control block for D2XDIM. The first instruction that processor 10 executes is a PIO instruction referencing I/O device 23 (the same PIO instruction that processor 12 attempted to run earlier). Processor 10 finds in the device location table that device 23 is connected to it by I/O bus 20, and so processor 10 performs the PIO operation on I/O bus 20.

The D2XDIM process continues to be executed on processor 10 for some time. It only executes PIO instructions to I/O device 23 which is connected to processor 10. When the D2XDIM process attempts a PIO instruction to the I/O device at address 24, processor 10 locks D2XDIM to processor 12 by modifying the locked descriptor word in the PCB for D2XDIM and saves the registers for D2XDIM in the PCB for D2XDIM. Processor 10 determines that processor 12 is executing a process which is lower in priority than D2XDIM, so processor 10 sends a message to processor 12 indicating that the currently running process must be preempted. Processor 10 finds a new task to run, and processor 12 executes D2XDIM as soon as it is possible to preempt the currently running process. Processor 12 will execute the PIO instruction to I/O device 24 when it runs D2XDIM.

The D2XDIM program does nothing special to deal with the multiple I/O buses. The program has no notion of the processor on which it is being executed, or of the I/O bus to which it is issuing commands. The same program runs in a uniprocessor, single I/O bus environment with no modifications.

While there has been shown and described what is at present considered the preferred embodiments of the present invention, it will be obvious to those skilled in the art that various changes and modifications may be made therein without departing from the scope of the invention as defined by the appended claims.

What is claimed is:

1. A method for performing an input/output process containing a programmed input/output instruction in a multiprocessor system including at least two processors, each of said processors being coupled to an I/O bus with one or more I/O devices connected thereto, said multiprocessor system including an operating system having process scheduling means for executing processes on said processors according to assigned priority, said process scheduling means including a process control block containing scheduling information for each of said processes said method comprising the steps of:

establishing a global device location table accessible by each of said processors in which a unique I/O device address and a corresponding I/O bus location are stored for each I/O device in said multiprocessor system;

when starting a programmed input/output instruction, determining the unique address of a referenced I/O device;

reading the corresponding I/O bus location of the referenced I/O device from the global device location table;

determining whether the referenced I/O device is connected to the local I/O bus, and when the referenced I/O device is connected to the local I/O bus, executing the input/output process on the local processor, when the referenced I/O device is connected to a prescribed remote I/O bus, placing a locked descriptor in the process control block for the input/output process indicating that the input/output process can be performed only on the remote processor coupled with the prescribed remote I/O bus, saving the registers of the input/output process in its process control block, scheduling the input/output process on the remote processor coupled with the prescribed remote I/O bus in accordance with the priority assigned to the I/O process by the operating system, and executing the input/output process on the remote processor coupled with the prescribed remote I/O bus.

2. A method as defined in claim 1 wherein the step of scheduling the input/output process includes the steps of determining whether the input/output process is higher in priority than the process currently running on the remote processor coupled with the prescribed remote I/O bus, and when the input/output process is higher in priority than the process currently running on the remote processor associated with the prescribed remote I/O bus, signalling said remote processor to preempt its currently running process and perform the input/output process.

3. A method for performing an input/output process containing a programmed input/output instruction in a multiprocessor system including at least two processors, each of said processors coupled to an I/O bus with one or more I/O devices connected thereto, and further including an operating system having process scheduling means for executing processes on said processors according to assigned priority, said process scheduling means including a process control block for each of said processors, said method comprising the steps of:

storing a unique I/O device address and a corresponding I/O bus location for each I/O device of the multiprocessor system in a global device location table accessible by each of said processors;

determining the unique address of a referenced I/O device prior to performing the programmed input/output instruction;

reading the corresponding I/O bus location of the referenced I/O device from the global device location table;

executing the input/output process on the local processor when the referenced I/O device is connected to the local I/O bus, and when the referenced I/O device is connected to a prescribed remote I/O bus, placing a locked descriptor in the process control block for the input/output process indicating that the input/output process can be performed only on the remote processor coupled with the prescribed remote I/O bus;

saving the registers of the input/output process in its process control block, scheduling the input/output process on the remote processor coupled with the prescribed remote I/O bus in accordance with the priority assigned to the I/O process by the operating system, and executing the input/output process on the remote processor coupled with the prescribed remote I/O bus.

4. A method as defined in claim 3 wherein the step of storing a unique I/O device address and corresponding I/O bus location for each I/O device includes the step of polling each I/O bus to determine the addresses of the I/O devices connected thereon.

5. An apparatus for performing an input/output process containing a programmed input/output (PIO) instruction comprising:

at least two processors, each of said processors capable of executing programmed input/output instructions;

at least two I/O busses, each of said I/O busses coupled to one of said processors, each of said I/O busses having one or more I/O devices connected thereto;

a shared memory means accessible by each of said processors and defining a global device location table, said global device location table containing a unique I/O device address and a corresponding I/O bus location for each I/O device attached to said I/O busses;

means for determining the unique address of a reference I/o device for performing the PIO instruction;

means for reading the corresponding I/O bus location of the reference I/O device from the global device location table;

an operating system having process scheduling means for executing input/output processes on said processors according to priority assigned to said processes by said operating system, said process scheduling means further includes a process control block for each of said I/O processes, said process control block including a locked descriptor indicating that the I/O process is executable only on the processor to which the referenced I/O bus is coupled; and means for executing an I/O process on the processor coupled with the I/O bus on which the referenced I/O device is located.

6. The apparatus of claim 5 wherein each of said process control blocks for each of said I/O processes further comprises scheduling information.

* * * * *